US012748245B2

(12) United States Patent
Sousa et al.

(10) Patent No.: US 12,748,245 B2
(45) Date of Patent: Sep. 29, 2026

(54) OPTICAL FILM, BACKLIGHT, AND DISPLAY

(71) Applicant: 3M INNOVATIVE PROPERTIES COMPANY, St. Paul, MN (US)

(72) Inventors: Matthew E. Sousa, Rosemount, MN (US); Jason S. Petaja, Hudson, WI (US); Anthony M. Renstrom, Forest Lake, MN (US); William B. Kolb, Stillwater, MN (US); Robert D. Taylor, Stacy, MN (US); Benjamin J. Forsythe, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 212 days.

(21) Appl. No.: 18/570,767

(22) PCT Filed: Jun. 17, 2022

(86) PCT No.: PCT/IB2022/055654
§ 371 (c)(1),
(2) Date: Dec. 15, 2023

(87) PCT Pub. No.: WO2022/269437
PCT Pub. Date: Dec. 29, 2022

(65) Prior Publication Data

US 2024/0280734 A1 Aug. 22, 2024

Related U.S. Application Data

(60) Provisional application No. 63/202,749, filed on Jun. 23, 2021.

(51) Int. Cl.
*G02B 5/02* (2006.01)
*G02B 5/30* (2006.01)
*G02F 1/13357* (2006.01)

(52) U.S. Cl.
CPC ........... *G02B 5/0226* (2013.01); *G02B 5/305* (2013.01); *G02F 1/133605* (2013.01); *G02F 1/133606* (2013.01)

(58) Field of Classification Search
None
See application file for complete search history.

(56) References Cited

U.S. PATENT DOCUMENTS 5,706,134 A 1/1998 Konno et al.
5,882,774 A 3/1999 Jonza et al.
(Continued)

FOREIGN PATENT DOCUMENTS

JP 2008098106 A 4/2008
WO 1996019347 A2 6/1996
(Continued)

OTHER PUBLICATIONS

International Search Report for PCT Application No. PCT/IB2022/055654, mailed on Sep. 13, 2022, 4 pages.

*Primary Examiner* — Derek S. Chapel
(74) *Attorney, Agent, or Firm* — Jonathan L. Tolstedt

(57) ABSTRACT

An optical film includes an optically diffusive layer including a plurality of nanoparticles dispersed between and across opposing first and second major surfaces thereof. The plurality of nanoparticles has a nanoparticle size distribution including distinct first and second peaks at respective nanoparticle sizes d1 and d2, wherein $1.5 \leq d2/d1 \leq 10$. The optically diffusive layer includes a polymeric material bonding the nanoparticles to each other. For a substantially collimated substantially normally incident light, the optical film has, in a visible wavelength, an average specular transmittance VTs and an average total transmittance VTt, and in an infrared wavelength range, an average total transmittance
(Continued)

ITt and an average specular transmittance ITs, wherein 0.3≤(VTs/VTt)≤0.7, (VTs/ITs)≤0.25, and (ITs/ITt)≥0.7.

4 Claims, 11 Drawing Sheets

(56) References Cited

U.S. PATENT DOCUMENTS

| | | | | |
|---|---|---|---|---|
| 2008/0002256 | A1 | 1/2008 | Sasagawa et al. | |
| 2013/0040126 | A1* | 2/2013 | Pett | C09D 1/00 977/773 |
| 2013/0126844 | A1 | 5/2013 | Nishiyama | |
| 2013/0182331 | A1 | 7/2013 | Hebrink | |
| 2013/0186466 | A1 | 7/2013 | Hebrink et al. | |
| 2014/0299193 | A1* | 10/2014 | Kenney | C08J 7/043 137/561 R |
| 2017/0173535 | A1* | 6/2017 | Jiang | B01D 67/0069 |
| 2019/0025481 | A1 | 1/2019 | Du et al. | |
| 2020/0058724 | A1 | 2/2020 | Wang et al. | |
| 2023/0228919 | A1* | 7/2023 | Sousa | G02B 1/04 359/599 |

FOREIGN PATENT DOCUMENTS

| | | | |
|---|---|---|---|
| WO | 03096754 | W | 11/2003 |
| WO | 2008005760 | A1 | 1/2008 |
| WO | 2012047422 | A1 | 4/2012 |
| WO | 2012047749 | A1 | 4/2012 |
| WO | 2017127734 | A1 | 7/2017 |
| WO | 2020004086 | A1 | 1/2020 |
| WO | 2020155158 | A1 | 8/2020 |

* cited by examiner

OPTICAL FILM, BACKLIGHT, AND DISPLAY

CROSS REFERENCE TO RELATED APPLICATIONS

This application is a national stage filing under 35 U.S.C. 371 of PCT/IB2022/055654, filed Jun. 17, 2022, which claims the benefit of U.S. Provisionals Application No. 63/202,749, filed Jun. 23, 2021, the disclosure of which are incorporated by reference in their entireties herein.

TECHNICAL FIELD

The present disclosure relates, in general, to an optical film. In particular, the present disclosure relates to an optical film including an optically diffusive layer. The present disclosure further relates to a backlight including the optical film and a display including the backlight.

BACKGROUND

Optically diffusive layers are generally used in display devices to provide an optical haze in order to reduce optical artefacts, such as reflective moiré. However, the optical haze of the optically diffusive layers may change non-uniformly due to aging in an environment having high humidity and temperatures.

SUMMARY

In a first aspect, the present disclosure provides an optical film including an optically diffusive single layer. The optically diffusive single layer has an average thickness of between about 0.5 microns and about 5 microns. The optically diffusive single layer includes opposing first and second major surfaces. The optically diffusive single layer further includes a plurality of nanoparticles dispersed between and across the first and second major surfaces. The nanoparticles include silica. The plurality of nanoparticles has a nanoparticle size distribution including at least two distinct first and second peaks at respective nanoparticle sizes d1 and d2, wherein 1.5≤(d2/d1)≤10. The nanoparticles in the plurality of nanoparticles within a full width at half maximum (FWHM) of the first peak and within a FWHM of the second peak form respective W1 and W2 percent by weight of the plurality of nanoparticles, wherein 1.1≤(W1/W2)≤2. The optically diffusive single layer further includes a polymeric material bonding the nanoparticles to each other to form a plurality of nanoparticle aggregates defining a plurality of voids therebetween. For a substantially collimated substantially normally incident light and a visible wavelength range from about 420 nanometers (nm) to about 680 nm and an infrared wavelength range from about 900 nm to about 1000 nm, the optical film has, in the visible wavelength range, an average specular transmittance VTs and an average total transmittance VTt. Further, for the substantially collimated substantially normally incident light and the visible wavelength range and the infrared wavelength range, the optical film has, in the infrared wavelength range, an average total transmittance ITt, and an average specular transmittance ITs, wherein 0.3≤(VTs/VTt)≤0.7, (VTs/ITs)≤0.25, (ITs/ITt)≥0.7.

In a second aspect, the present disclosure provides an optical film including an optically diffusive layer bonded to a reflective polarizer. The optically diffusive layer includes a plurality of nanoparticles dispersed, and occupying more than 80% of a volume defined, between opposing major first and second surfaces of the optically diffusive layer. The plurality of nanoparticles forms a plurality of nanoparticle aggregates defining a plurality of voids therebetween. The major first and second surfaces are spaced apart by at least 2 microns. The plurality of nanoparticles has a nanoparticle size distribution including at least two distinct first and second peaks at respective nanoparticle sizes d1 and d2, wherein 1.5≤(d2/d1)≤10. The reflective polarizer includes a plurality of polymeric layers numbering at least 10 in total. Each of the polymeric layers has an average thickness of less than about 500 nm. The optical film has an optical haze of greater than about 30%, such that any decrease in the optical haze of the optical film by subjecting the optical film to a relative humidity of about 95% and a temperature of about 65 degrees Celsius for at least 200 hours is less than about 10%.

In a third aspect, the present disclosure provides a backlight including a back reflector. The backlight further includes the optical film of the second aspect disposed on the back reflector. The backlight further includes a lightguide disposed between the back reflector and the optical film. For a substantially collimated substantially normally incident light, a visible wavelength range from about 420 nm to about 680 nm, an infrared wavelength range from about 800 nm to about 1500 nm, and for each of mutually orthogonal first and second polarization states, the back reflector reflects at least 60% of the incident light for each wavelength in the visible wavelength range and transmits at least 30% of the incident light for at least one wavelength in the infrared wavelength range.

In a fourth aspect, the present disclosure provides a display including the backlight of the third aspect disposed between a liquid crystal panel and an infrared-sensitive detector, such that when an infrared emitting light source emitting an infrared light in the infrared wavelength range is disposed proximate the liquid crystal panel, the infrared-sensitive detector detects at least some of the emitted infrared light.

In a fifth aspect, the present disclosure provides an optical film including a reflective polarizer. The reflective polarizer includes a plurality of polymeric layers numbering at least 10 in total. Each of the polymeric layers has an average thickness of less than about 500 nm. The reflective polarizer includes a plurality of first protrusions on a major first surface thereof. The optical film further includes an optically diffusive layer disposed on the major first surface of the reflective polarizer. The optically diffusive layer includes a plurality of nanoparticles having a nanoparticle size distribution including at least two distinct first and second peaks at respective nanoparticle sizes d1 and d2, wherein 1.5≤(d2/d1)≤10. The optically diffusive layer substantially conforms to the first protrusions so as to form a plurality of concentric portions where the optically diffusive layer is substantially concentric with the first protrusions. The optically diffusive layer substantially conforms to the first protrusions so as to form a plurality of parallel portions where the optically diffusive layer is substantially parallel to the polymeric layers of the reflective polarizer. Further, the optically diffusive layer substantially conforms to the first protrusions so as to form a plurality of transition portions providing a gradual transition between the concentric portions and the parallel portions. For each first protrusion, a length of the transition portion corresponding to the first protrusion is less than three times a width of the first protrusion.

In a sixth aspect, the present disclosure provides an optical film including a reflective polarizer. The reflective polarizer includes a plurality of polymeric layers numbering at least 10 in total. Each of the polymeric layers has an average thickness of less than about 500 nm. The reflective polarizer includes a plurality of first protrusions on a major first surface thereof. The optical film further includes an optically diffusive layer disposed on the major first surface of the reflective polarizer. The optically diffusive layer includes a plurality of nanoparticles having a nanoparticle size distribution including at least two distinct first and second peaks at respective nanoparticle sizes d1 and d2, wherein $1.5 \leq (d2/d1) \leq 10$. The optically diffusive layer substantially conforms to the first protrusions so as to form a plurality of concentric portions where the optically diffusive layer is substantially concentric with the first protrusions. Further, the optically diffusive layer substantially conforms to the first protrusions so as to form a plurality of connecting portions connecting the plurality of concentric portions. A thickness variation of the optically diffusive layer across at least 80% of a total surface area of the optically diffusive layer occupied by the connecting portions is less than about 30%.

In a seventh aspect, the present disclosure provides an optical film including a reflective polarizer. The reflective polarizer includes a plurality of polymeric layers numbering at least 10 in total. Each of the polymeric layers has an average thickness of less than about 500 nm. The reflective polarizer includes a plurality of first protrusions on a major first surface thereof. The optical film further includes an optically diffusive layer disposed on the major first surface of the reflective polarizer. The optically diffusive layer includes a plurality of nanoparticles having a nanoparticle size distribution including at least two distinct first and second peaks at respective nanoparticle sizes d1 and d2, wherein $1.5 \leq (d2/d1) \leq 10$. The optically diffusive layer substantially conforms to the first protrusions so as to form a plurality of concentric portions where the optically diffusive layer is substantially concentric with the first protrusions, and a plurality of connecting portions connecting the plurality of concentric portions. For a substantially collimated substantially normally incident light and a visible wavelength range from about 420 nm to about 680 nm and an infrared wavelength range from about 900 nm to about 1000 nm, a diffuse reflectance of the optical film versus wavelength has a global minimum at a first wavelength disposed between the visible and infrared wavelength ranges.

BRIEF DESCRIPTION OF DRAWINGS

Exemplary embodiments disclosed herein is more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labelled with the same number.

DETAILED DESCRIPTION

Figure 1:
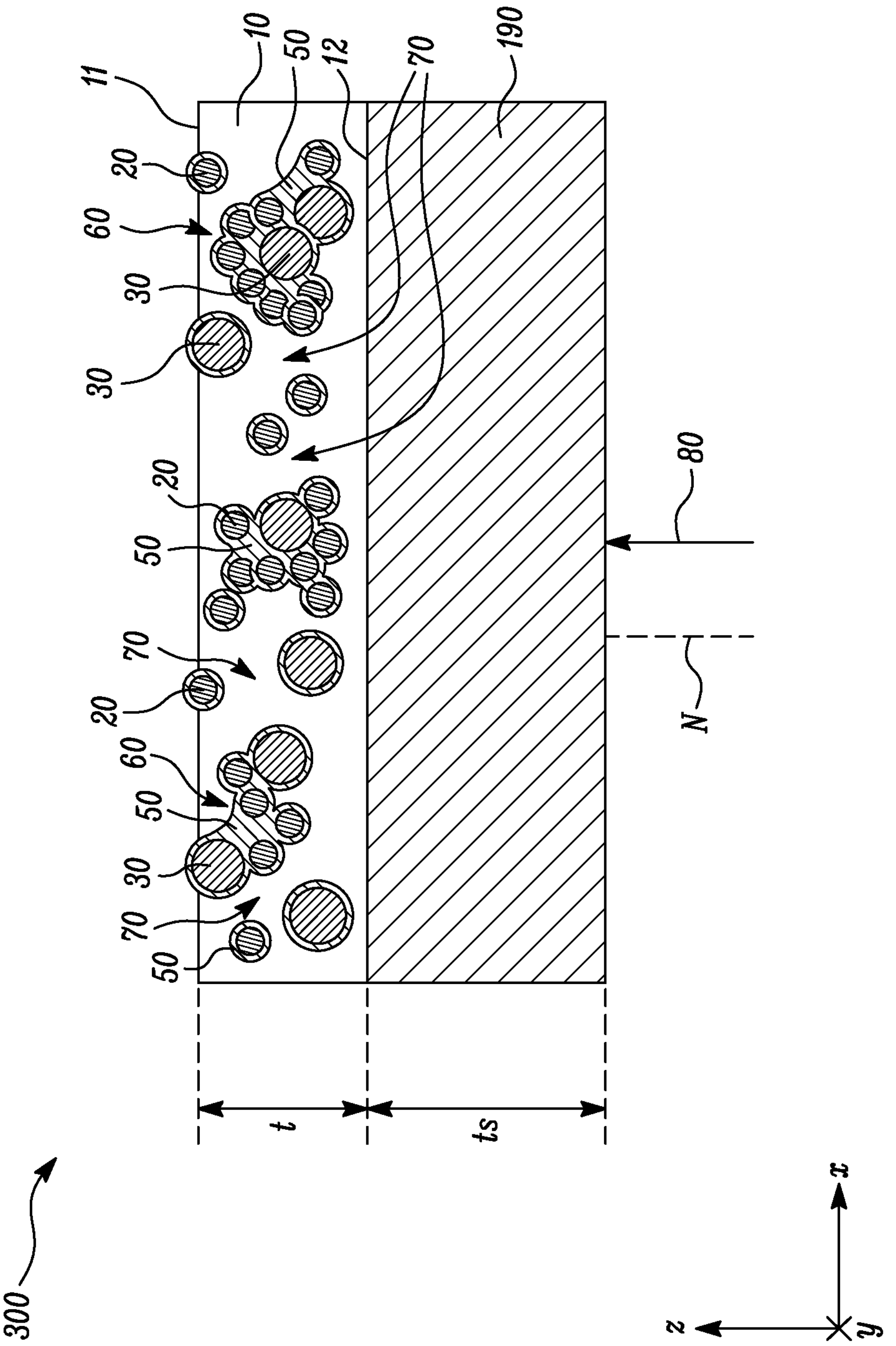
FIG. 1 illustrates a detailed schematic sectional view of an optical film including an optically diffusive layer, according to an embodiment of the present disclosure.

In the following description, reference is made to the accompanying figures that form a part thereof and in which various embodiments are shown by way of illustration. It is to be understood that other embodiments are contemplated and is made without departing from the scope or spirit of the present disclosure. The following detailed description, therefore, is not to be taken in a limiting sense. In the following disclosure, the following definitions are adopted.

As used herein, all numbers should be considered modified by the term “about”. As used herein, “a,” “an,” “the,” “at least one,” and “one or more” are used interchangeably.

As used herein as a modifier to a property or attribute, the term “generally”, unless otherwise specifically defined, means that the property or attribute would be readily recognizable by a person of ordinary skill but without requiring absolute precision or a perfect match (e.g., within +/−20% for quantifiable properties).

The term “substantially”, unless otherwise specifically defined, means to a high degree of approximation (e.g., within +/−10% for quantifiable properties) but again without requiring absolute precision or a perfect match.

The term “about”, unless otherwise specifically defined, means to a high degree of approximation (e.g., within +/−5% for quantifiable properties) but again without requiring absolute precision or a perfect match.

As used herein, the terms “first” and “second” are used as identifiers. Therefore, such terms should not be construed as limiting of this disclosure. The terms “first” and “second” when used in conjunction with a feature or an element can be interchanged throughout the embodiments of this disclosure.

As used herein, when a first material is termed as “similar” to a second material, at least 90 weight % of the first and second materials are identical and any variation between the first and second materials comprises less than about 10 weight % of each of the first and second materials.

As used herein, "at least one of A and B" should be understood to mean "only A, only B, or both A and B".

As used herein, the term "film" generally refers to a material with a very high ratio of length or width to thickness. A film has two major surfaces defined by a length and width. Films typically have good flexibility and can be used for a wide variety of applications, including displays. Films may also be of thickness or material composition, such that they are semi-rigid or rigid. Films described in the present disclosure may be composed of various polymeric materials. Films may be monolayer, multilayer, or blend of different polymers.

As used herein, the term "layer" generally refers to a thickness of material within a film that has a relatively consistent chemical composition. Layers may be of any type of material including polymeric, cellulosic, metallic, or a blend thereof. A given polymeric layer may include a single polymer-type or a blend of polymers and may be accompanied by additives. A given layer may be combined or connected to other layers to form films. A layer may be either partially or fully continuous as compared to adjacent layers or the film. A given layer may be partially or fully coextensive with adjacent layers. A layer may contain sub-layers.

As used herein, the term "specular transmittance" generally refers to a transmission of light through a body where an angular distribution of the transmitted light is substantially the same as that of an incident light incident on the body.

As used herein, the term "diffuse transmittance" generally refers to a transmission of light through a body where an angular distribution of the transmitted light is different from an angular distribution of an incident light incident on the body.

As used herein, the term "total transmittance" generally refers to a combined transmission of all light, including by specular and diffuse transmittances.

As used herein, the term "diffuse reflectance" generally refers to a reflection of a light at a body where an angular distribution of the reflected light is different from an angular distribution of an incident light incident on the body.

As used herein, the term "between about", unless otherwise specifically defined, generally refers to an inclusive or a closed range. For example, if a parameter X is between about A and B, then $A \le X \le B$.

As used herein, the term "dry thickness", generally refers to a thickness of a coating or a film after a solvent present in the coating or the film has dried.

The present disclosure relates to an optical film including an optically diffusive layer. The present disclosure further relates to a backlight including the optical film. The backlight including the optical film may be used in a display. In some examples, the optical film may be used in a backlight of a display device. The display device may be incorporated into an electronic device, such as a computer monitor, a television, a mobile phone, a personal digital assistant (PDAs), a wearable device or any other portable device. In some other examples, the optical film may be used in a backlight of an optical biometric scanning device, such as a fingerprint scanner, a retinal scanner etc.

Generally, the display devices including a liquid crystal panel include the backlight as the liquid crystal panel itself is not self-illuminating. Light emitted by the backlight passes through the liquid crystal panel to reach a viewer. However, such display devices may be susceptible to optical artifacts, such as reflective moiré. To reduce such optical artifacts, the backlight of such display devices may be provided with optical films including porous coatings to provide an optical haze to the display device. However, conventional porous coatings may be susceptible to aging. Specifically, the optical films including the conventional porous coatings may provide a non-uniform optical haze upon continued exposure to high temperatures and/or high humidity, such as a relative humidity of 95% and a temperature of 65 degrees Celsius (° C.) for about 200 hours. In some cases, the optical haze of the conventional porous coatings may substantially decrease upon continued exposure to high temperatures and/or high humidity. Therefore, the conventional porous coatings may perform poorly in environmental durability performance tests, specifically, high temperature or high humidity tests.

One way to mitigate the effect of aging may be to increase a dry thickness of the conventional porous coatings. The dry thickness may be increased by including nanoparticles having a size of about 75 nanometers (nm) in the conventional porous coatings. However, such increased dry thickness may negatively affect a cohesive strength of the conventional porous coatings, and may lead to a premature mechanical failure of the conventional porous coatings.

In an aspect, the present disclosure provides an optical film including an optically diffusive single layer. The optically diffusive single layer has an average thickness of between about 0.5 microns and about 5 microns. The optically diffusive single layer includes opposing first and second major surfaces. The optically diffusive single layer further includes a plurality of nanoparticles dispersed between and across the first and second major surfaces. The nanoparticles include silica. The plurality of nanoparticles has a nanoparticle size distribution including at least two distinct first and second peaks at respective nanoparticle sizes d1 and d2, wherein $1.5 \le (d2/d1) \le 10$. The nanoparticles in the plurality of nanoparticles within a full width at half maximum (FWHM) of the first peak and within a FWHM of the second peak form respective W1 and W2 percent by weight of the plurality of nanoparticles, wherein $1.1 \le (W1/W2) \le 2$. The optically diffusive single layer further includes a polymeric material bonding the nanoparticles to each other to form a plurality of nanoparticle aggregates defining a plurality of voids therebetween. For a substantially collimated substantially normally incident light and a visible wavelength range from about 420 nm to about 680 nm and an infrared wavelength range from about 900 nm to about 1000 nm, the optical film has, in the visible wavelength range, an average specular transmittance VTs and an average total transmittance VTt. Further, for the substantially collimated substantially normally incident light and the visible wavelength range and the infrared wavelength range, the optical film has, in the infrared wavelength range, an average total transmittance ITt and an average specular transmittance ITs, wherein $0.3 \le (VTs/VTt) \le 0.7$. $(VTs/ITs) \le 0.25$. $(ITs/ITt) \ge 0.7$. The optically diffusive layer of the optical film may provide an optical haze in the visible wavelength range due to the presence of the plurality of nanoparticles and the plurality of voids. However, the optically diffusive layer may provide a substantially high specular transmittance in the infrared wavelength range. Therefore, the optical film may be suitable for use with optical sensors operating in the infrared wavelength range, or in display devices that uses such optical sensors for various applications, such as fingerprint sensing.

Further, the plurality of nanoparticles having the nanoparticle size distribution including the at least two distinct first and second peaks at the respective nanoparticle sizes d1 and d2, such that $1.5 \le (d2/d1) \le 10$, and the respective weight percentages W1 and W2 of the nanoparticles within the respective FWHMS of the first and second peaks, such that $1.1 \leq (W1/W2) \leq 2$, may provide an increased dry thickness of the optically diffusive layer without negatively affecting a cohesive strength of the optically diffusive layer. The increased dry thickness of the optically diffusive layer may reduce the negative effect of aging. i.e., non-uniform optical haze upon continued exposure to high temperatures and/or high humidity, without compromising the cohesive strength of the optically diffusive layer. Specifically, the decrease in the optical haze of the optical film by subjecting the optical film to a relative humidity of about 95% and a temperature of about 65° C. for at least 200 hours is less than about 10%.

Further, the optical haze provided by the optically diffusive layer may be controlled by varying the weight percentages W1 and W2 and/or the nanoparticle sizes d2 and d1 of the plurality of nanoparticles.

Referring now to figures. FIG. 1 illustrates a detailed schematic sectional view of an optical film 300, according to an embodiment of the present disclosure.

The optical film 300 defines mutually orthogonal x-, y-, and z-axes. The x- and y-axes correspond to in-plane axes of the optical film 300, while the z-axis is a transverse axis disposed along a thickness of the optical film 300. In other words, x- and y-axes are disposed along a plane (i.e., x-y plane) of the optical film 300, and the z-axis is perpendicular to the plane of the optical film 300. The z-axis may be interchangeably referred to as "the thickness direction".

The optical film 300 includes an optically diffusive single layer 10. The optically diffusive single layer 10 can be interchangeably referred to as "the optically diffusive layer 10". The optically diffusive layer 10 includes opposing first and second major surfaces 11, 12. The optically diffusive layer 10 has an average thickness t. The optically diffusive layer 10 defines the average thickness t along the z-axis. The term "average thickness", as used herein, refers to an average thickness along a plane (i.e., the x-y plane) of the optically diffusive layer 10. In some embodiments, the average thickness t of the optically diffusive layer 10 may be measured between the opposing first and second major surfaces 11, 12. In some embodiments, the optically diffusive layer 10 has the average thickness t of between about 0.5 microns and about 5 microns.

Figure 2:
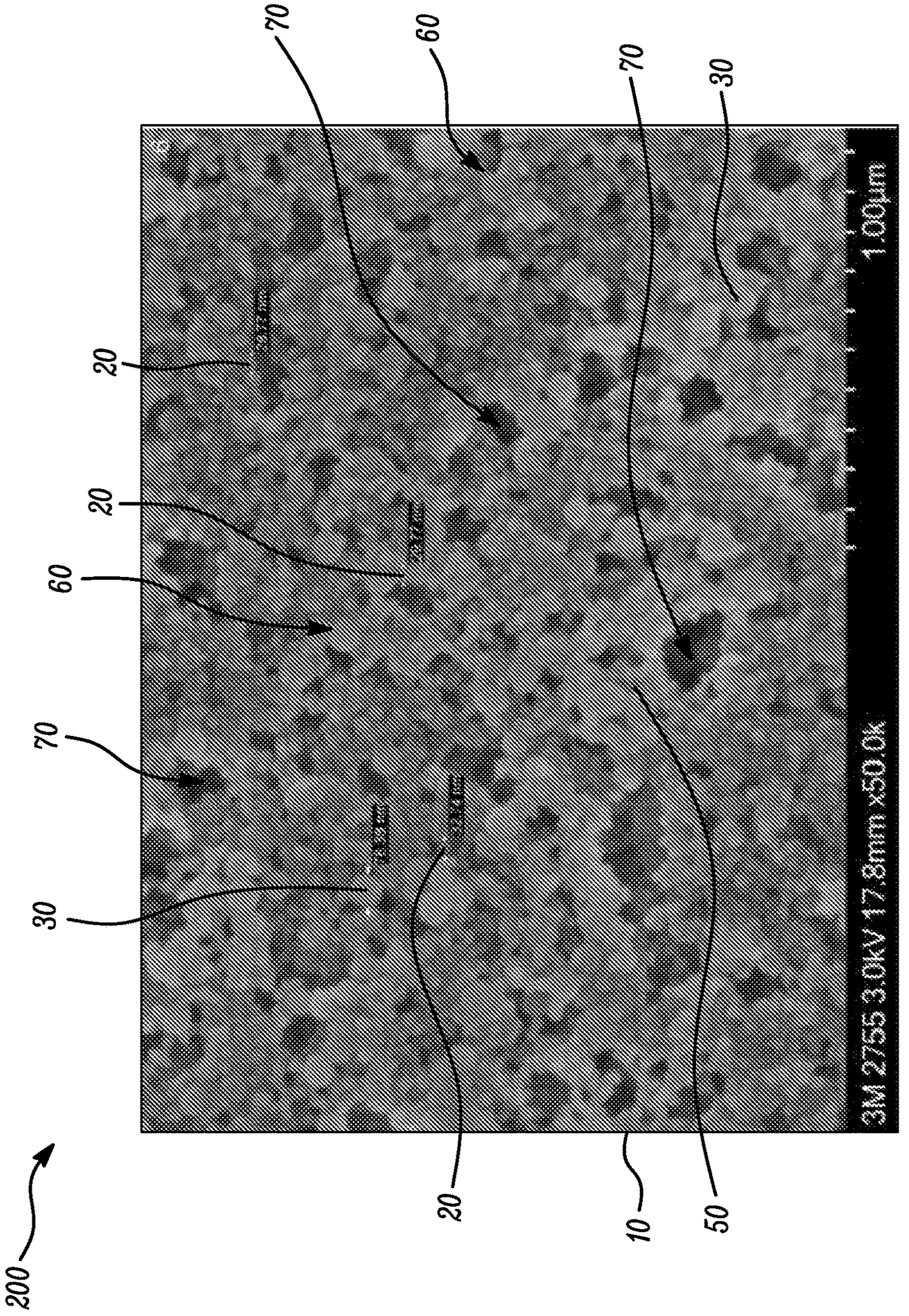
FIG. 2 illustrates a scanning electron microscope (SEM) image depicting a top view of the optically diffusive layer of FIG. 1, according to an embodiment of the present disclosure.

In some embodiments, the first and second major surfaces 11, 12 may be interchangeably referred to as "the major first and second surfaces 11, 12". In some embodiments, the major first and second surfaces 11, 12 are spaced apart by at least 2 microns. In some embodiments, the major first and second surfaces 11, 12 are spaced apart by at least 4 microns, at least 6 microns, or at least 8 microns. In other words, in some embodiments, the optically diffusive layer 10 has the average thickness t of at least 2 microns, at least 4 microns, at least 6 microns, or at least 8 microns. FIG. 2 illustrates an exemplary scanning electron microscope (SEM) image 200 depicting a top view of the optically diffusive layer 10.

Referring now to FIGS. 1 and 2, the optically diffusive layer 10 further includes a plurality of nanoparticles. Specifically, the plurality of nanoparticles includes a plurality of first nanoparticles 20 and a plurality of second nanoparticles 30. In some embodiments, the plurality of first nanoparticles 20 and the plurality of second nanoparticles 30 may be collectively referred to as "the plurality of nanoparticles 20, 30". The plurality of nanoparticles 20, 30 are dispersed between and across the first and second major surfaces 11, 12.

In some embodiments, the plurality of nanoparticles 20, 30 occupy more than 80% of a volume defined between the opposing major first and second surfaces 11, 12 of the optically diffusive layer 10. In some embodiments, the plurality of nanoparticles 20, 30 occupy more than about 85%, or more than about 90% of the volume defined between the opposing major first and second surfaces 11, 12 of the optically diffusive layer 10.

The nanoparticles 20, 30 include silica. In some embodiments, the nanoparticles 20, 30 include functionalized silica. In some embodiments, the nanoparticles 20, 30 are substantially spherical. Further, in some embodiments, in a plane of a cross-section of the optically diffusive layer 10 in the thickness direction (i.e., in the z-x plane), the nanoparticles 20, 30 are substantially circular. Further, in some embodiments, in a plane of a cross-section of the optically diffusive layer 10 along the x-y plane, the nanoparticles may be substantially circular.

The plurality of nanoparticles 20, 30 forms a plurality of nanoparticle aggregates 60.

Specifically, the optically diffusive layer 10 includes a polymeric material 50 bonding the plurality of nanoparticles 20, 30 to each other to form the plurality of nanoparticle aggregates 60. The plurality of nanoparticle aggregates 60 defines a plurality of voids 70 therebetween. In some embodiments, the polymeric material 50 includes pentaerythritol triacrylate.

As shown in FIG. 1, in some embodiments, the optical film 300 further includes a substrate 190 disposed on the optically diffusive layer 10. In some embodiments, the optically diffusive layer 10 is bonded to the substrate 190. In some embodiments, the optically diffusive layer 10 is bonded to the substrate 190 via an optically clear adhesive layer, or an epoxy layer.

In some embodiments, the substrate 190 includes one or more of polyethylene terephthalate (PET), polycarbonate, polymethyl methacrylate (PMMA), polyvinyl chloride (PVC), polyvinyl alcohol (PVA), polyolefin, polyethylene, polyethylene naphthalate, cellulose acetate, polystyrene, and polyimide.

The substrate 190 has an average thickness ts. The average thickness ts is defined along the z-axis. The term "average thickness", as used herein, refers to an average thickness along a plane (i.e., the x-y plane) of the substrate 190. In some embodiments, the substrate 190 has the average thickness ts of between about 20 microns and about 500 microns. In some embodiments, the substrate 190 has the average thickness ts of between about 20 microns and about 300 microns, between about 20 microns and about 200 microns, or between about 20 microns and about 100 microns.

In some embodiments, the optically diffusive layer 10 may be deposited on the substrate 190 in a form of wet coating. In such cases, the average thickness t of the optically diffusive layer 10 may be measured after the wet coating has dried. In other words, the average thickness t of the optically diffusive layer 10 may be a dry thickness.

FIG. 1 further illustrates a substantially collimated substantially normally incident light 80 incident on the optical film 300. In other words, the substantially collimated substantially normally incident light 80 is incident at an angle of about 0 degree with respect to a normal N to the optical film 300. In some embodiments, the normal N may be substantially along the z-axis of the optical film 300. Further, the term "substantially collimated", as used herein, refers to a full divergence angle of a light being less than about 20 degrees. Therefore, the substantially collimated substantially normally incident light 80 incident on the optical film 300 may have a full divergence angle (not shown) of less than about 20 degrees. The substantially collimated substantially normally incident light 80 may be interchangeably referred to as "the incident light 80".

In some cases, the incident light 80 may have a first polarization state. In some embodiments, the first polarization state may refer to a polarization along the x-axis. In some cases, the incident light 80 may have an orthogonal second polarization state. In some embodiments, the orthogonal second polarization state may refer to a polarization along the y-axis. In some embodiments, the incident light 80 may include a mixture of the first and second polarization states.

In some embodiments, the substrate 190 includes an absorbing polarizer. In some embodiments, for the substantially collimated substantially normally incident light 80 and a visible wavelength range 81 (shown in FIG. 5) from about 420 nm to about 680 nm, the absorbing polarizer has an average optical transmittance of at least 40% for the first polarization state. In other words, for the incident light 80 and the visible wavelength range 81, the absorbing polarizer has the average optical transmittance of at least 40% for the polarization along the x-axis. In some embodiments, for the incident light 80 and the visible wavelength range 81, the absorbing polarizer has the average optical transmittance of at least 50%, at least 60%, at least 70%, at least 80%, or at least 90% for the first polarization state.

In some embodiments, for the substantially collimated substantially normally incident light 80 and the visible wavelength range 81, the absorbing polarizer has an average optical absorption of at least 60% for the orthogonal second polarization state. In other words, for the incident light 80 and the visible wavelength range 81, the absorbing polarizer has the average optical absorption of at least 60% for the polarization along the y-axis. In some embodiments, for the incident light 80 and the visible wavelength range 81, the absorbing polarizer has the average optical absorption of at least 70%, at least 80%, at least 90%, or at least 95% for the orthogonal second polarization state.

Therefore, for the incident light 80 and the visible wavelength range 81, the absorbing polarizer may substantially transmit the incident light 80 having the first polarization state and may substantially absorb the incident light 80 having the orthogonal second polarization state. In other words, for the incident light 80 and the visible wavelength range 81, the absorbing polarizer may substantially pass the incident light 80 having the first polarization state and may substantially block the incident light 80 having the orthogonal second polarization state.

In some other embodiments, the substrate 190 includes an optical mirror. In these embodiments, for the substantially collimated substantially normally incident light 80 and the visible wavelength range 81, the optical mirror has an average optical reflectance of at least 60% for each of mutually orthogonal first and second polarization states. In other words, for the incident light 80 and the visible wavelength range 81, the optical mirror has the average optical reflectance of at least 60% for the polarizations along each of the mutually orthogonal x- and y-axes. In some embodiments, for the incident light 80 and the visible wavelength range 81, the optical mirror has the average optical reflectance of at least 70%, at least 80%, at least 90%, or at least 95% for each of the mutually orthogonal first and second polarization states. Therefore, the optical mirror may selectively transmit or reflect light irrespective of the polarization of the incident light 80.

Figure 3:
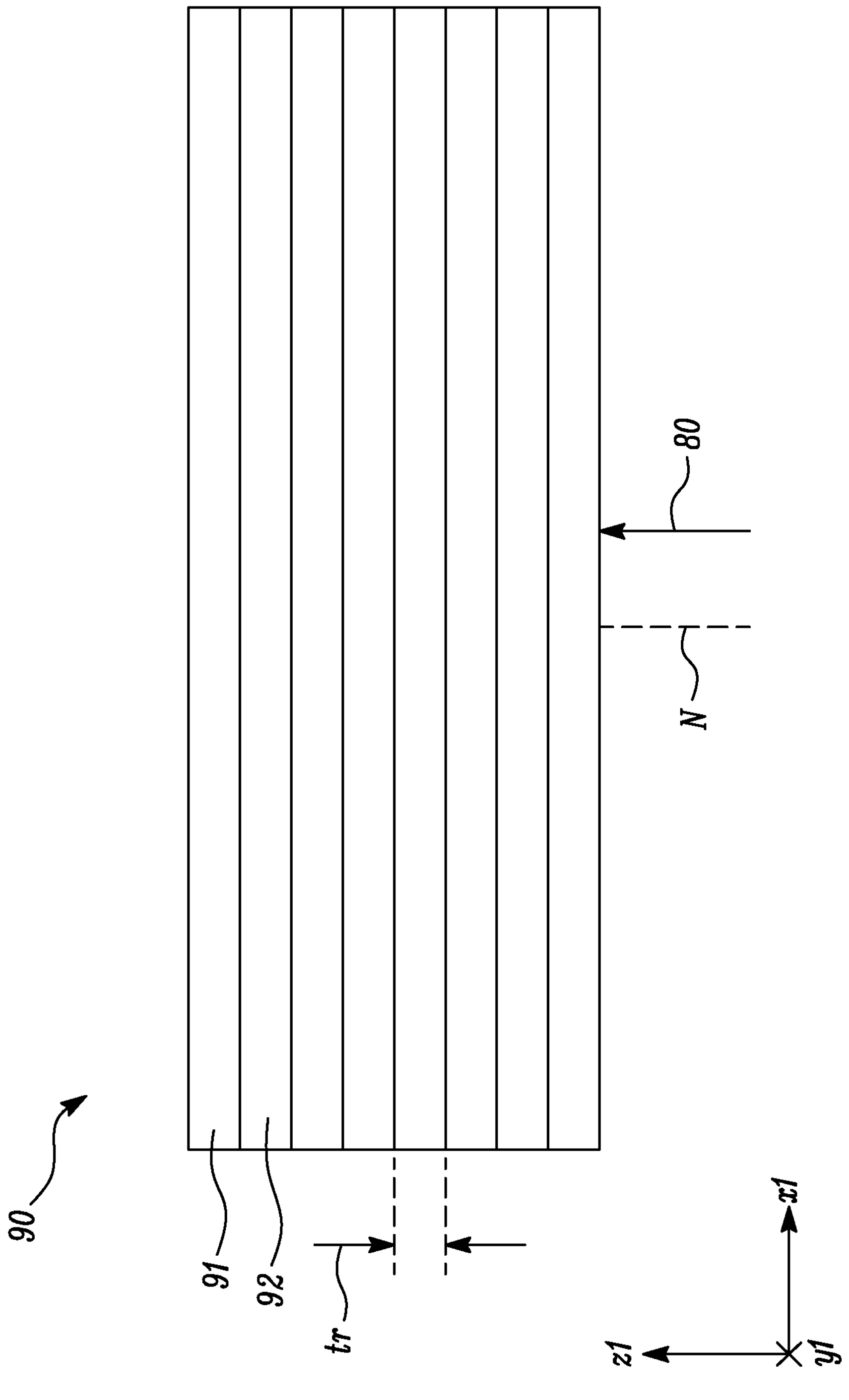
FIG. 3 illustrates a schematic sectional view of a reflective polarizer, according to an embodiment of the present disclosure.

FIG. 3 illustrates a detailed schematic sectional view of a reflective polarizer 90, according to an embodiment of the present disclosure.

Referring to FIGS. 1 and 3, in some embodiments, the substrate 190 includes the reflective polarizer 90. In some embodiments, the optically diffusive layer 10 is bonded to the reflective polarizer 90. Reflective polarizers rely on the difference in refractive index between at least two materials, usually polymeric materials, to selectively reflect light of one polarization state while transmitting light in an orthogonal polarization state.

The reflective polarizer 90 defines the mutually orthogonal x1-, y1-, and z1-axes. The x1- and y1-axes correspond to in-plane axes of the reflective polarizer 90, while the z1-axis is a transverse axis disposed along a thickness of the reflective polarizer 90. In other words, x1- and y1-axes are along a plane (i.e., x1-y1 plane) of the reflective polarizer 90, and the z1-axis is perpendicular to the plane of the reflective polarizer 90. i.e., along the thickness of the reflective polarizer 90. In some embodiments, the x1-, y1-, and z1-axes of the reflective polarizer 90 may correspond to the x-, y-, and z-axes, respectively, of the optical film 300 (shown in FIG. 1).

The reflective polarizer 90 includes a plurality of polymeric layers. In the illustrated embodiment of FIG. 3, the reflective polarizer 90 includes a plurality of alternating first and second polymeric layers 91, 92. The plurality of alternating first and second polymeric layers 91, 92 may be interchangeably referred to as "the plurality of polymeric layers 91, 92" or "the polymeric layers 91, 92". In some embodiments, the plurality of polymeric layers 91, 92 are disposed adjacent to each other along the z1-axis. The plurality of polymeric layers 91, 92 number at least 10 in total. In some embodiments, each of the polymeric layers 91, 92 has an average thickness tr. The average thickness tr is defined along the z1-axis. The term "average thickness", as used herein, refers to an average thickness along a plane (i.e., the x1-y1 plane) of each of the polymeric layers 91, 92. Each of the polymeric layers 91, 92 has the average thickness tr of less than about 500 nm.

In some embodiments, for the substantially collimated substantially normally incident light 80 and the visible wavelength range 81 (shown in FIG. 5), the reflective polarizer 90 has an average optical transmittance of at least 40% for the first polarization state. In other words, for the incident light 80 and the visible wavelength range 81, the reflective polarizer 90 has the average optical transmittance of at least 40% for the polarization along the x-axis. In some embodiments, for the incident light 80 and the visible wavelength range 81, the reflective polarizer 90 has the average optical transmittance of at least 50%, at least 60%, at least 70%, at least 80%, or at least 90% for the first polarization state.

In some embodiments, for the substantially collimated substantially normally incident light 80 and the visible wavelength range 81, the reflective polarizer 90 has an average optical reflectance of at least 40% for the orthogonal second polarization state. In other words, for the incident light 80 and the visible wavelength range 81, the reflective polarizer 90 has the average optical reflectance of at least 40% for the polarization along the y-axis. In some embodiments, for the incident light 80 and the visible wavelength range 81, the reflective polarizer 90 has the average optical reflectance of at least 50%, at least 60%, at least 70%, at least 80%, or at least 90% for the orthogonal second polarization state.

Therefore, for the incident light 80 and the visible wavelength range 81, the reflective polarizer 90 may substantially transmit the incident light 80 having the first polarization state and may substantially reflect the incident light 80 having the orthogonal second polarization state. In other words, for the incident light 80 and the visible wavelength range 81, the reflective polarizer 90 may substantially pass the incident light 80 having the first polarization state and may substantially block the incident light 80 having the orthogonal second polarization state.

In some embodiments, for the first polarization state and the visible wavelength range 81, the reflective polarizer 90 has a greater average optical transmittance for light incident at a smaller incident angle and a smaller average optical transmittance for light incident at a greater incident angle. Specifically, for the first polarization state and the visible wavelength range 81, the reflective polarizer 90 has a greater average optical transmittance for light (e.g., the incident light 80) having a smaller incident angle with respect to the normal N and a smaller average optical transmittance for light incident at a greater incident angle (not shown) with respect to the normal N. In other words, for the first polarization state and the visible wavelength range 81, the average optical transmittance of the reflective polarizer 90 for the incident light 80 decreases with an increase in an incident angle of the incident light 80 with respect to the normal N. Therefore, for the first polarization state and the visible wavelength range 81, the reflective polarizer 90 may have a greater on-axis optical transmittance than an off-axis optical transmittance.

Figure 4:
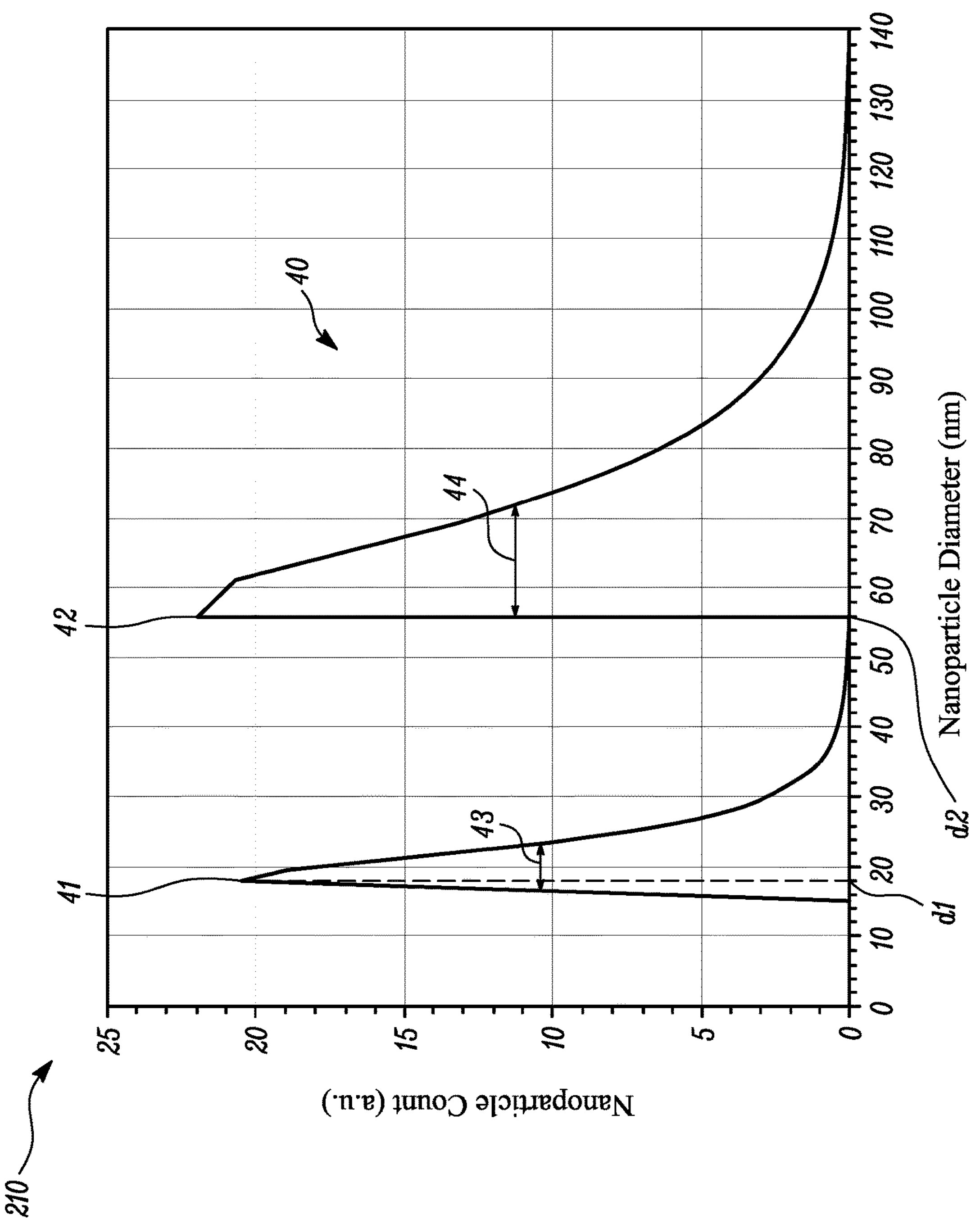
FIG. 4 illustrates a plot depicting a nanoparticle size distribution of a plurality of nanoparticles of the optically diffusive layer of FIG. 1, according to an embodiment of the present disclosure.

FIG. 4 illustrates an exemplary plot 210 depicting a nanoparticle size distribution 40 of the plurality of nanoparticles 20, 30 (shown in FIGS. 1 and 2). Specifically, the plot 210 depicts the nanoparticle size distribution 40 of the plurality of first nanoparticles 20 and the plurality of second nanoparticles 30. Further, the plot 210 depicts nanoparticle sizes of the plurality of nanoparticles 20, 30 as a diameter of substantially spherical nanoparticles 20, 30. A nanoparticle count is depicted in arbitrary units (a.u.) on the ordinate axis, and a nanoparticle diameter is depicted in nanometers (nm) on the abscissa.

As is apparent from the plot 210, the plurality of nanoparticles 20, 30 have the nanoparticle size distribution 40 including at least two distinct first and second peaks 41, 42 at respective nanoparticle sizes d1 and d2. Therefore, a majority of the plurality of nanoparticles 20, 30 have the nanoparticle sizes d1 and d2. Specifically, a majority of the plurality of first nanoparticles 20 has the nanoparticle size d1 and a majority of the plurality of second nanoparticles 30 has the nanoparticle size d2. A ratio of the nanoparticle size d2 to the nanoparticle size d1 is greater than or equal to 1.5 and less than or equal to 10. i.e., $1.5 \le (d2/d1) \le 10$. In other words, the nanoparticle size d2 is greater than the nanoparticle size d1 by a factor of greater than or equal to about 1.5 and less than or equal to about 10. In some embodiments, the nanoparticle size d1 is greater than or equal to about 5 nm and less than or equal to about 50 nm. i.e., 5 nm≤d1≤50 nm. In some embodiments, the nanoparticle size d2 is greater than or equal to about 50 nm and less than or equal to about 100 nm. i.e., 50 nm≤d2≤100 nm. In the plot 210, the value of the nanoparticle size d1 (i.e., at the first peak 41) is about 18 nm, and the value of the nanoparticle size d2 (i.e., at the second peak 42) is about 56 nm. Therefore. (d2/d1) is about 3.1. In some other examples, the nanoparticle size d1 is about 20 nm, and the nanoparticle size d2 is about 75 nm. Therefore. (d2/d1) is 3.75.

Further, the nanoparticles in the plurality of nanoparticles 20, 30 within a full width at half maxima (FWHM) 43 of the first peak 41 and within a FWHM 44 of the second peak 42 form respective W1 and W2 percent by weight of the plurality of nanoparticles 20, 30. In other words, the nanoparticles within the FWHM 43 of the first peak 41 form W1 percent by weight of the plurality of nanoparticles 20, 30 and the nanoparticles within the FWHM 44 of the second peak 42 form W2 percent by weight of the plurality of nanoparticles 20, 30. In the plot 210, the FWHM 43 is between about 17 nm and about 22 nm, and the FWHM 44 is between about 56 nm and about 72 nm. Therefore, the nanoparticles having a particle size between about 17 nm and about 22 nm form W1 percent by weight of the plurality of nanoparticles 20, 30 and the nanoparticles having a particle size between about 56 nm and about 72 nm form W2 percent by weight of the plurality of nanoparticles 20, 30.

A ratio of W1 to W2 is greater than or equal to about 1.1 and less than or equal to about 2. i.e., $1.1 \le (W1/W2) \le 2$. In other words, a percent by weight (i.e., W1) of the plurality of first nanoparticles 20 is greater than a percent by weight (i.e., W2) of the plurality of second nanoparticles 30 by a factor of greater than or equal to about 1.1 and less than or equal to about 2. In some embodiments. $1.1 \le (W1/W2) \le 1.8$, or $1.1 \le (W1/W2) \le 1.6$. In some examples, W1 is about 60% and W2 is about 40%. Therefore (W1/W2) is 1.5.

Figure 5:
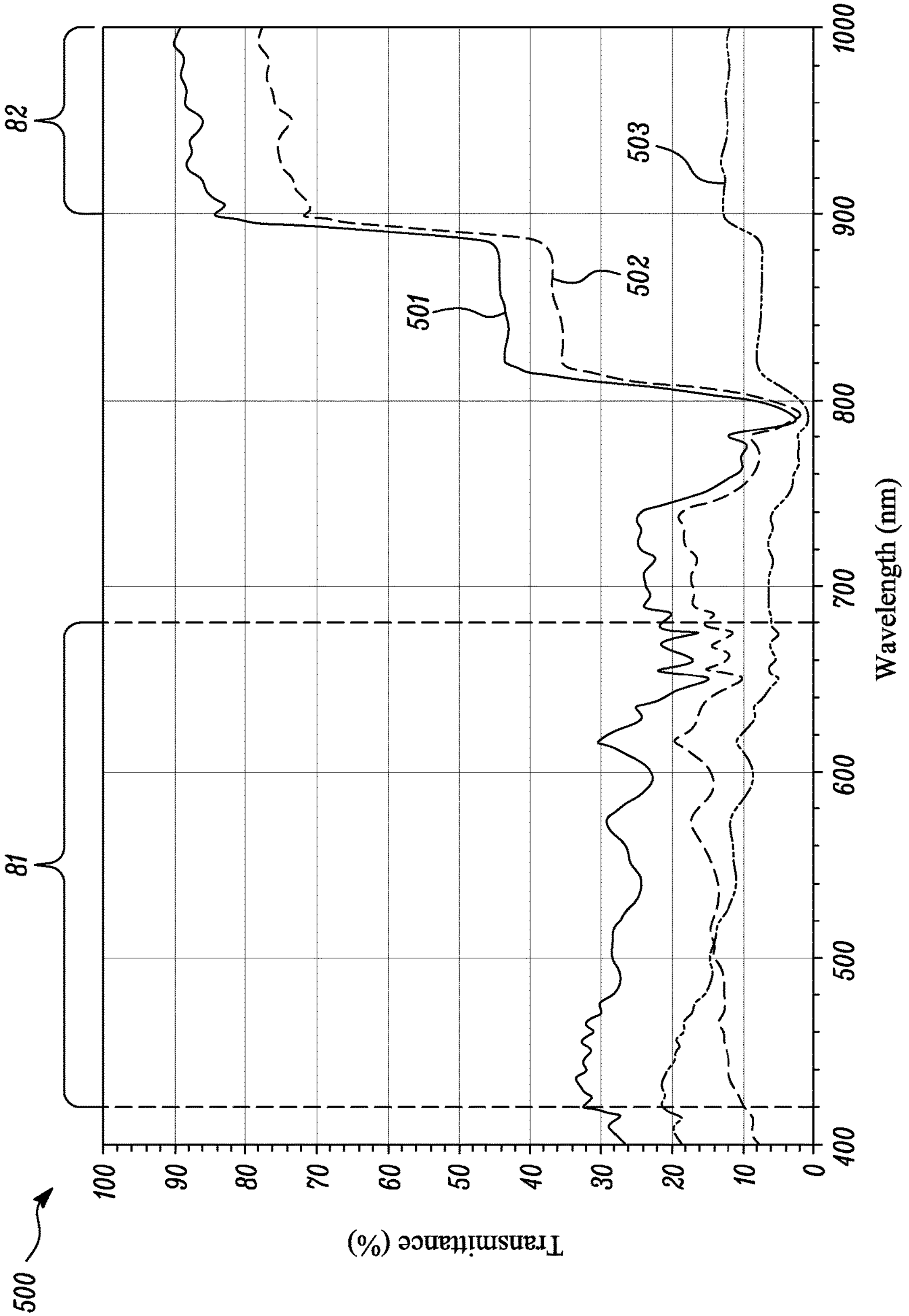
FIG. 5 illustrates a plot depicting optical characteristics of the optical film of FIG. 1, according to an embodiment of the present disclosure.

FIG. 5 illustrates a plot 500 depicting optical characteristics of the optical film 300 shown in FIG. 1, according to an embodiment of the present disclosure. Specifically, the plot 500 depicts a specular transmittance, a diffuse transmittance, and a total transmittance of the optical film 300 for the incident light 80 (shown in FIG. 1), where total transmittance=(specular transmittance+diffuse transmittance). Wavelength is expressed in nanometers (nm) on the abscissa, and transmittance is expressed as a transmittance percentage on the left ordinate axis.

Referring to FIGS. 1 and 5, the plot 500 includes a curve 501 depicting the total transmittance of the optical film 300, a curve 502 depicting the specular transmittance of the optical film 300, and a curve 503 depicting the diffuse transmittance of the optical film 300. Specifically, the curve 501 depicts a variation of the total transmittance of the optical film 300 with wavelength of incident light. The curve 502 depicts a variation of the specular transmittance of the optical film 300 with wavelength of incident light. Further, the curve 503 depicts a variation of the diffuse transmittance of the optical film 300 with wavelength of incident light.

As depicted by the curve 501, for the substantially collimated substantially normally incident light 80 and the visible wavelength range 81 and an infrared wavelength range 82 from about 900 nm to about 1000 nm, the optical film 300 has, in the visible wavelength range 81, an average total transmittance VTt.

As depicted by the curve 502, for the substantially collimated substantially normally incident light 80 and the visible wavelength range 81 and the infrared wavelength range 82, the optical film 300 has, in the visible wavelength range 81, an average specular transmittance VTs.

Further, as depicted by the curve 503, for the substantially collimated substantially normally incident light 80 and the visible wavelength range 81 and the infrared wavelength range 82, the optical film 300 has, in the visible wavelength range 81, an average diffuse transmittance VTd.

In some embodiments, a ratio of the average specular transmittance VTs to the average total transmittance VTt is greater than or equal to about 0.3 and less than or equal to about 0.7. i.e., $0.3 \le (VTs/VTt) \le 0.7$. In other words, for the visible wavelength range 81, the average specular transmittance VTs of the optical film 300 may be greater than or equal to about 30% and less than or equal to about 70% of the average total transmittance VTt of the optical film 300. Therefore, for the visible wavelength range 81, the average diffuse transmittance VTd of the optical film 300 may be less than or equal to about 70% and greater than or equal to about 30% of the average total transmittance VTt of the optical film 300 (i.e., a remaining portion of the average total transmittance VTt of the optical film 300). In other words, for the visible wavelength range 81, a portion of the incident light 80 exits the optical film 300 as a diffused light, thereby providing an optical haze in the visible wavelength range 81. In some embodiments. 0.3≤(VTs/VTt)≤0.65, 0.3≤(VTs/VTt) ≤0.6, or 0.3≤(VTs/VTt)≤0.55. In other words, in some embodiments, the ratio of the average specular transmittance VTs to the average total transmittance VTt is greater than or equal to about 0.3 and less than or equal to about 0.65, greater than or equal to about 0.3 and less than or equal to about 0.6, greater than or equal to about 0.3 and less than or equal to about 0.55, or greater than or equal to about 0.3 and less than or equal to about 0.5. Based on the value of VTd of the optical film 300, the amount of the incident light 80 exiting the optical film 300 as the diffused light may vary, and therefore the optical haze of the optical film 300 may be correspondingly varied as per desired application attributes. The diffuse transmittance of the optical film 300 may be attributed to a scattering of the incident light 80 due to presence of the plurality of nanoparticles 20, 30 and the presence of the plurality of voids 70 in the optically diffusive layer 10. The optical haze of the optical film 300 may be directly proportional to the amount of the incident light 80 scattered by the plurality of nanoparticles 20, 30. Further, the amount of the incident light 80 scattered by the plurality of nanoparticles 20, 30 may depend on at least one of d2/d1 and W1/W2, and may be varied by correspondingly varying at least one of d2/d1 and W1/W2 as per desired application attributes. In other words, by controlling at least one of d2/d1 and W1/W2 of the plurality of nanoparticles 20, 30 in the optically diffusive layer 10, the optical haze of the optical film 300 may be varied as per desired application attributes.

In some examples, for the optically diffusive layer 10 having the average thickness t of about 2.7 microns. VTt is about 26.5%. VTs is about 14.1% and VTd is about 12.4%. In this example, (VTs/VTt) is about 0.53. Further. VTd is about 47% of VTt, thereby imparting the optical haze to the optical film 300.

As depicted by the curve 501, for the substantially collimated substantially normally incident light 80 and the visible wavelength range 81 and the infrared wavelength range 82, the optical film 300 has, in the infrared wavelength range 82, an average total transmittance ITt As depicted by the curve 502, for the substantially collimated substantially normally incident light 80 and the visible wavelength range 81 and the infrared wavelength range 82, the optical film 300 has, in the infrared wavelength range 82, an average specular transmittance ITs.

Further, as depicted by the curve 503, for the substantially collimated substantially normally incident light 80 and the visible wavelength range 81 and the infrared wavelength range 82, the optical film 300 has, in the infrared wavelength range 82, an average diffuse transmittance ITd.

In some embodiments, a ratio of the average specular transmittance ITs to the average total transmittance ITt is equal to or greater than about 0.7. i.e., (ITs/ITt)≥0.7. In other words, the average specular transmittance ITs of the optical film 300 may be greater than or equal to about 70% of the average total transmittance ITt of the optical film 300. Therefore, the average diffuse transmittance ITd of the optical film 300 may be less than about 30% of the average total transmittance ITt of the optical film 300 (i.e., a remaining portion of the average total transmittance ITt of the optical film 300). In other words, for the infrared wavelength range 82, the optical film 300 may provide a substantially specular transmission of the incident light 80. In some embodiments. (ITs/ITt)≥0.75, or (ITs/ITt)≥ 0.8. In other words, the ratio of the average specular transmittance ITs to the average total transmittance ITt is equal to or greater than about 0.75, or equal to or greater than about 0.8.

In some examples, for the optically diffusive layer 10 having the average thickness t of about 2.7 microns. ITt is about 87.5% and ITs is about 75%. In this example, (ITs/ITt) is about 0.85. In other words. ITs is about 85% of ITt. i.e., for the infrared wavelength range 82, the optical film 300 may provide a substantially specular transmission of the incident light 80.

Thus, the optical film 300 may be used in applications which require substantially specular transmission in infrared wavelength ranges, such as for optical biometric scanning applications including fingerprint scanning, retinal scanning, etc.

Further, a ratio of the average specular transmittance VTs of the optical film 300 to the average specular transmittance ITs of the optical film 300 is equal to or less than 0.25. i.e., (VTs/ITs)≤0.25. In other words, the optical film 300 has a substantially greater average specular transmittance in the infrared wavelength range 82 as compared to the visible wavelength range 81. Thus, the optical film 300 may be suitable for use in applications which may require substantially specular transmittance in the infrared wavelength range 82 and the optical haze in the visible wavelength range 81. In some embodiments. (VTs/ITs)≤0.22, or (VTs/ITs) ≤0.2. In some examples, for the optically diffusive layer 10 having the average thickness t of about 2.7 microns. VTs is about 14.1% and ITs is about 75%. In this example, (VTs/ITs) is about 0.18.

Referring now to FIGS. 1, 4 and 5, the optically diffusive layer 10 may provide the optical film 300 with the optical haze in the visible wavelength range 81 and provide a substantially high specular transmission in the infrared wavelength range 82.

Further, due to the nanoparticle size distribution 40 of the pluralities of first and second nanoparticles 20, 30, the optically diffusive layer 10 may have an increased dry thickness, as compared to a conventional porous coating, without negatively affecting a cohesive strength of the optically diffusive layer 10. The increased dry thickness of the optically diffusive layer 10 may reduce a negative effect of aging. i.e., non-uniform optical haze upon continued exposure to high temperatures and/or high humidity. An increased dry thickness may reduce non-uniform changes in the optical haze of the optical film 300 due to aging. Specifically, in some embodiments, the optical film 300 has the optical haze of greater than about 30%, such that any decrease in the optical haze of the optical film 300 by subjecting the optical film 300 to a relative humidity of about 95% and a temperature of about 65° C. for at least 200 hours is less than about 10%. In some examples, the optical film 300 has the optical haze of about 45%.

Figure 6A:
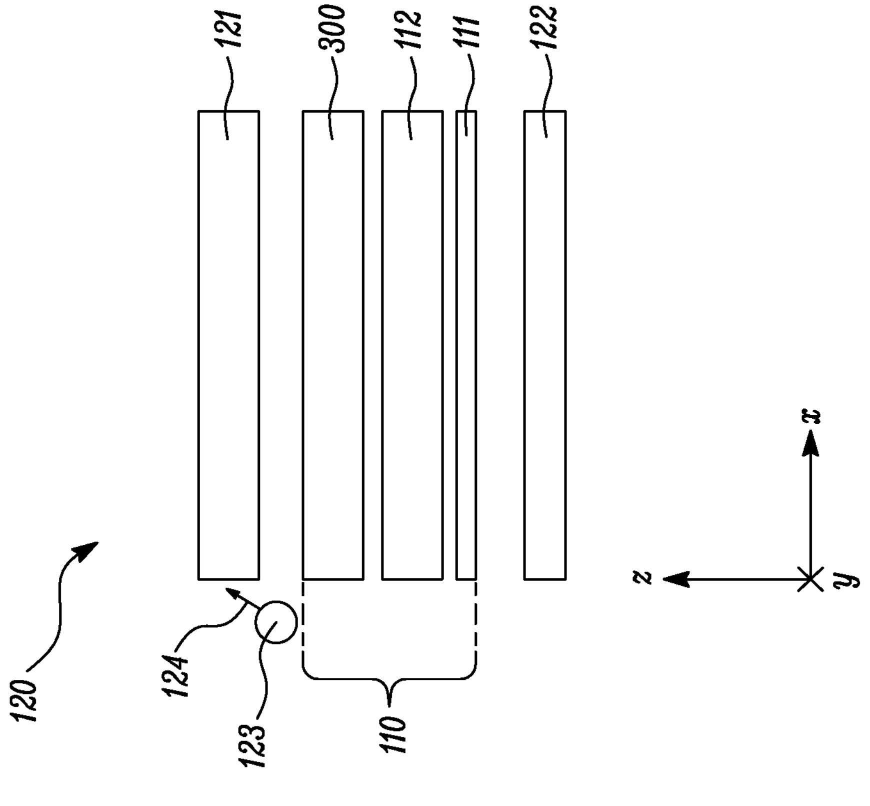
FIG. 6A illustrates a detailed schematic sectional view of a display including the optical film of FIG. 1, according to an embodiment of the present disclosure.

FIG. 6A illustrates a detailed schematic sectional view of a display 120 including the optical film 300, according to an embodiment of the present disclosure. The display 120 includes a backlight 110. In some embodiments, the backlight 110 includes a back reflector 111 and the optical film 300 disposed on the back reflector 111. In some embodiments, the optical film 300 and the back reflector 111 may form a recycling optical cavity therebetween.

In some embodiments, the backlight 110 further includes a lightguide 112 disposed between the back reflector 111 and the optical film 300. In some embodiments, the lightguide 112 may be a solid lightguide. In some embodiments, the lightguide 112 may be a step wedge lightguide. In some embodiments, the lightguide 112 may use total internal reflection (TIR) to transport or guide a light incident on the lightguide 112 toward the optical film 300. In some cases, the lightguide 112 may improve uniformity of the light that will be incident on the optical film 300. In some embodiments, the lightguide 112 may include a diffusing layer or a light redirecting layer to provide a desired angular distribution of the light that will be incident on the optical film 300.

The backlight 110 is disposed between a liquid crystal panel 121 and an infrared-sensitive detector 122, such that when an infrared emitting light source 123 emitting an infrared light 124 in the infrared wavelength range (e.g., the infrared wavelength range 82 shown in FIG. 5) is disposed proximate the liquid crystal panel 121, the infrared-sensitive detector 122 detects at least some of the emitted infrared light 124. In some applications, the display 120 may include a fingerprint scanner. The infrared light 124 emitted by the infrared emitting light source 123 may pass through the liquid crystal panel 121 and be reflected from a finger (not shown) placed on the liquid crystal panel 121. Therefore, the light reflected from the finger may include some of the emitted infrared light 124. The light reflected from the finger may be transmitted through the optical film 300 and the back reflector 111 to be detected by the infrared-sensitive detector 122.

Figure 6B:
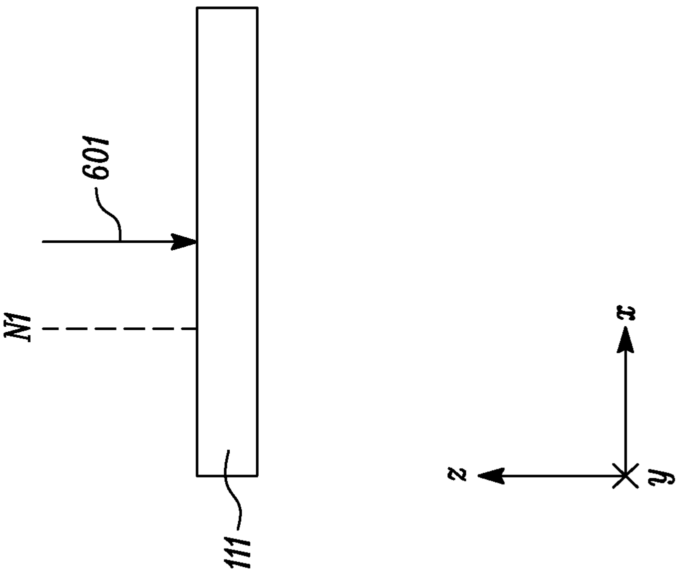
FIG. 6B illustrates a schematic sectional view of a back reflector of the display of FIG. 6A, according to an embodiment of the present disclosure.

FIG. 6B illustrates a schematic sectional view of the back reflector 111 of the display 120 shown in FIG. 6A, according to an embodiment of the present disclosure. FIG. 6B further illustrates a substantially collimated substantially normally incident light 601 incident on the back reflector 111. i.e., the substantially collimated substantially normally incident light 601 is incident at an angle of about 0 degree with respect to a normal N1 to the back reflector 111. In some embodiments, the normal N1 may be substantially parallel to the normal N (shown in FIG. 1). The substantially collimated substantially normally incident light 601 may be interchangeably referred to as "the incident light 601".

In some cases, the incident light 601 may have mutually orthogonal first and second polarization states. In some embodiments, the mutually orthogonal first and second polarization states may refer to polarizations along the x- and y-axes, respectively.

Referring to FIGS. 6A and 6B, in some embodiments, for the substantially collimated substantially normally incident light 601, a visible wavelength range from about 420 nm to about 680 nm and an infrared wavelength range from about 800 nm to about 1500 nm, and for each of the mutually orthogonal first and second polarization states, the back reflector 111 reflects at least 60% of the incident light 601 for each wavelength in the visible wavelength range. In some embodiments, for the incident light 601, the visible wavelength range and the infrared wavelength range, and for each of the mutually orthogonal first and second polarization states, the back reflector 111 reflects at least 70%, at least 80%, at least 90%, or at least 95% of the incident light 601 for each wavelength in the visible wavelength range. In other words, for each of the mutually orthogonal first and second polarization states, the back reflector 111 substantially reflects the incident light 601 for each wavelength in the visible wavelength range.

In some embodiments, for the substantially collimated substantially normally incident light 601, the visible wavelength range and the infrared wavelength range, and for each of the mutually orthogonal first and second polarization states, the back reflector 111 transmits at least 30% of the incident light 601 for at least one wavelength in the infrared wavelength range. In some embodiments, for the incident light 601, the visible wavelength range and the infrared wavelength range, and for each of the mutually orthogonal first and second polarization states, the back reflector 111 transmits at least 30%, at least 40%, at least 50%, at least 60%, at least 70%, or at least 80% of the incident light 601 for the at least one wavelength in the infrared wavelength range. In other words, for each of the mutually orthogonal first and second polarization states, the back reflector 111 transmits at least a portion of the incident light 601 for the at least one wavelength in the infrared wavelength range.

Therefore, the back reflector 111 may be highly reflective for each wavelength in the visible wavelength range. Such high reflectivity for each wavelength in the visible wavelength range may reduce the amount of loss in the recycling cavity defined between the optical film 300 and the back reflector 111. Further, such high reflectivity for each wavelength in the visible wavelength range may include both specular and diffuse reflections. In some embodiments, the back reflector 111 may be a predominantly specular, diffuse, or combination specular/diffuse reflector, whether spatially uniform or patterned. In some embodiments, the back reflector 111 may be a semi-specular reflector. In some cases, the back reflector 111 may include a stiff metal substrate with a high reflectivity coating, or a high reflectivity film laminated to a supporting substrate. In some embodiments, the back reflector 111 may include one or more elements, such as silver, aluminum, a white coating, a non-conductive coating, etc.

Figure 7A:
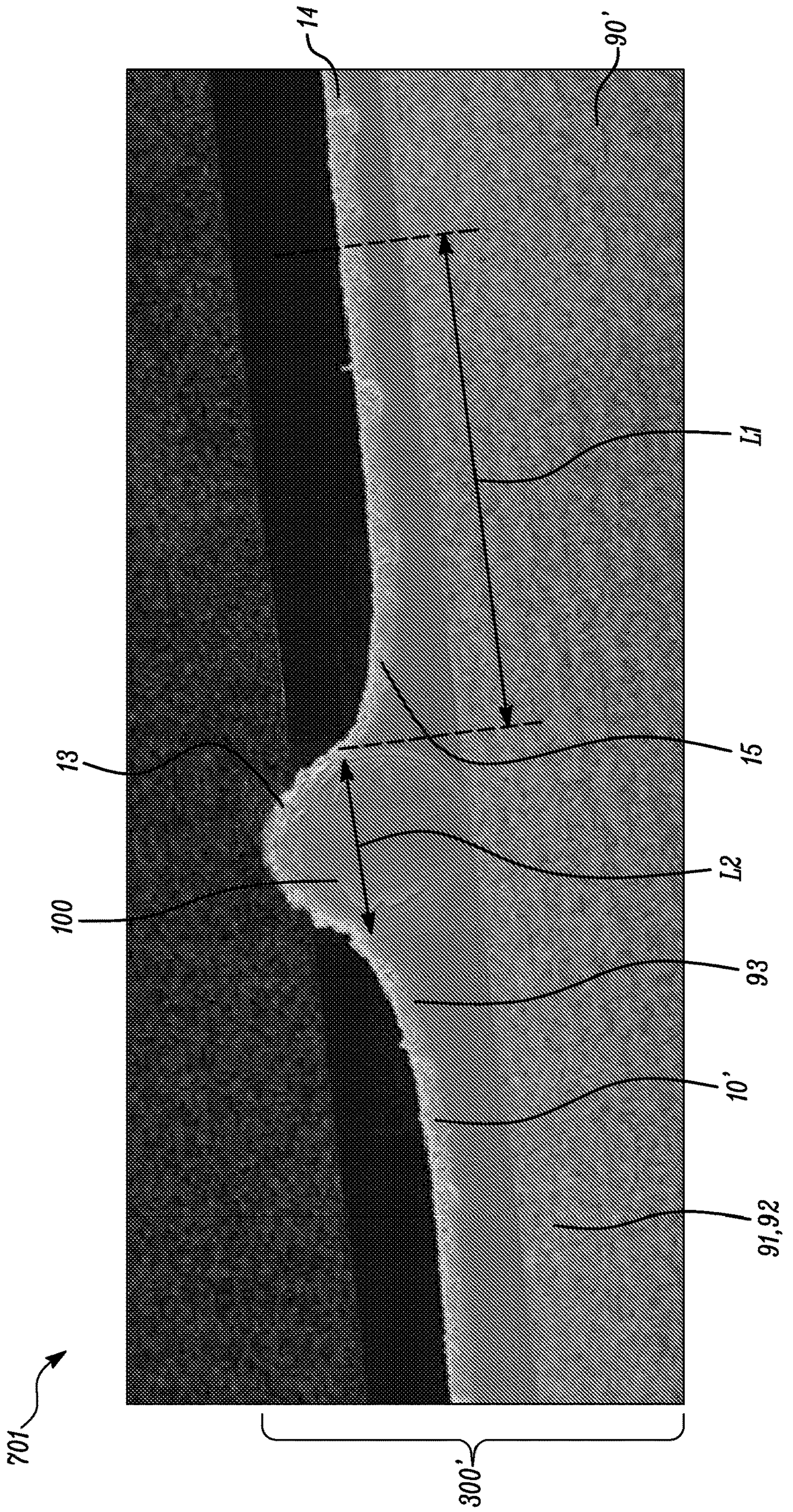
FIG. 7A illustrates an SEM image depicting a detailed sectional view of an optical film, according to another embodiment of the present disclosure.
Figure 7B:
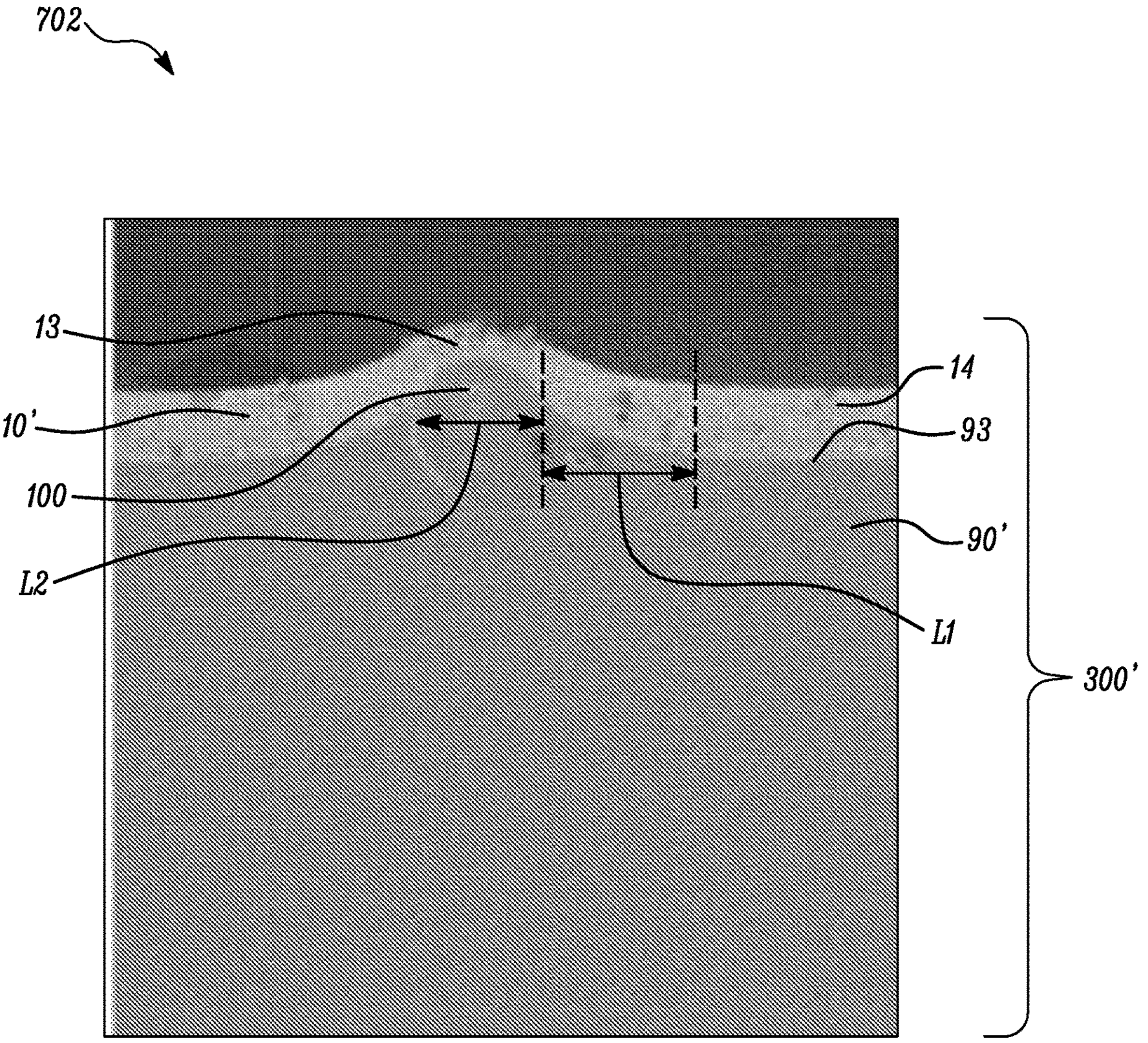
FIG. 7B illustrates another SEM image depicting a detailed sectional view of the optical film of FIG. 7A, according to an embodiment of the present disclosure.

FIGS. 7A and 7B illustrate scanning electron microscopy (SEM) images 701, 702, respectively depicting detailed side sectional views of an optical film 300', according to another embodiment of the present disclosure. The optical film 300' depicted in FIGS. 7A and 7B is substantially similar to the optical film 300 of FIG. 1. However, the optical film 300' includes a reflective polarizer 90' and an optically diffusive layer 10'. Common components between the optical film 300' and the optical film 300 are illustrated using the same reference numerals.

The reflective polarizer 90' is substantially similar to the reflective polarizer 90 shown in FIG. 3. However, the reflective polarizer 90' includes a plurality of first protrusions 100 on a major first surface 93 thereof.

The optically diffusive layer 10' is disposed on the major first surface 93 of the reflective polarizer 90'. The optically diffusive layer 10' is substantially similar to the optically diffusive layer 10 of FIG. 1. However, the optically diffusive layer 10' substantially conforms to the first protrusions 100.

The optically diffusive layer 10' substantially conforms to the first protrusions 100 so as to form a plurality of concentric portions 13 where the optically diffusive layer 10' is substantially concentric with the first protrusions 100. In the illustrated embodiment of FIGS. 7A and 7B, one of the first protrusions 100 is shown for clarity purposes.

Further, the optically diffusive layer 10' substantially conforms to the first protrusions 100 so as to form a plurality of parallel portions 14 where the optically diffusive layer 10' is substantially parallel to the polymeric layers 91, 92 of the reflective polarizer 90'.

Further, the optically diffusive layer 10' substantially conforms to the first protrusions 100 so as to form a plurality of transition portions 15 providing a gradual transition between the concentric portions 13 and the parallel portions 14. For each first protrusion 100, a length L1 of the transition portion 15 corresponding to the first protrusion 100 is less than three times a width L2 of the first protrusion 100, i.e., L1<3L2.

Figure 7C:
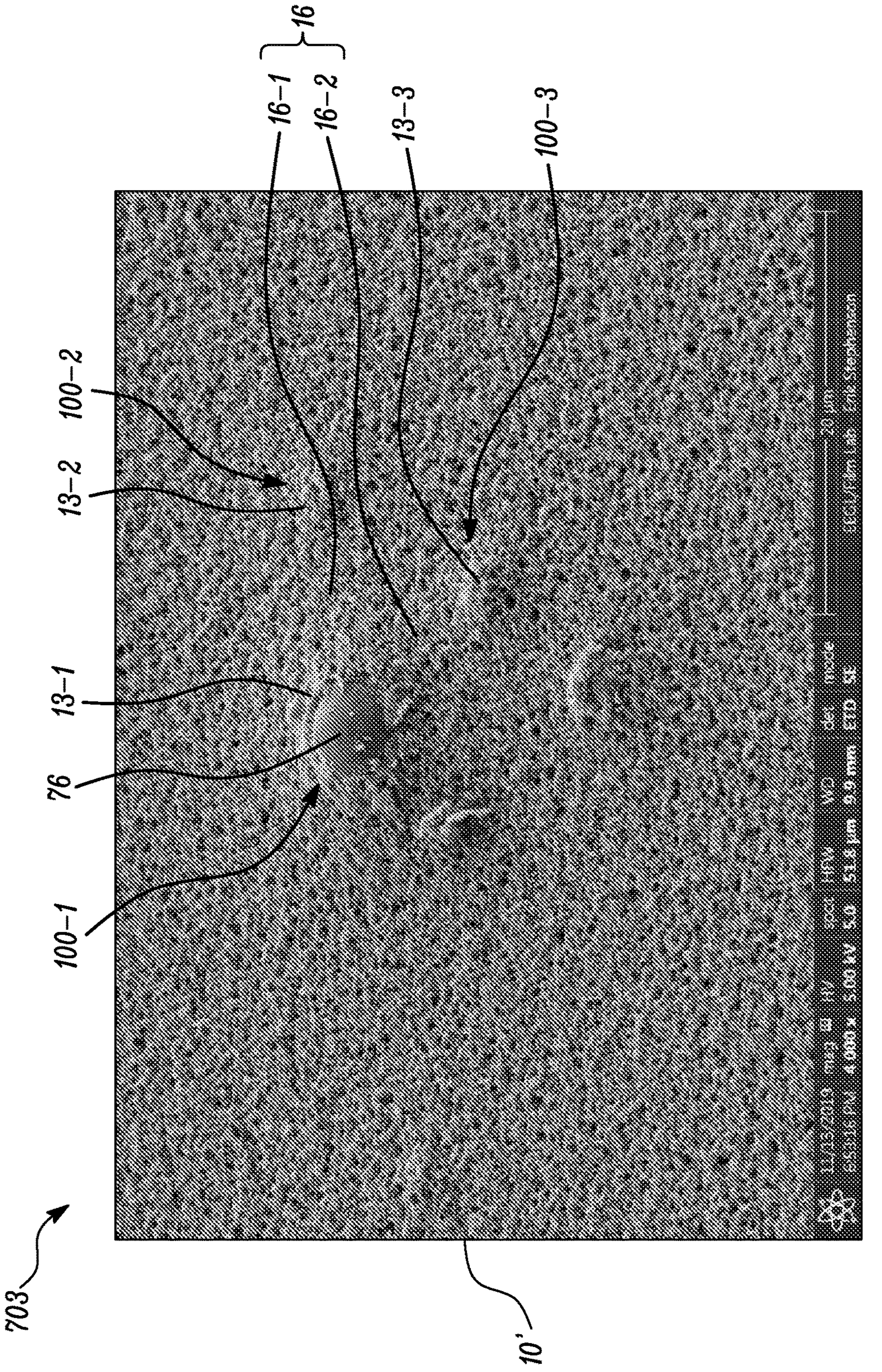
FIG. 7C illustrates an SEM image depicting a top view of the optical film, according to an embodiment of the present disclosure.

FIG. 7C illustrates an SEM image 703 depicting a top view of the optical film 300' of FIGS. 7A and 7B, according to an embodiment of the present disclosure.

Referring now to FIGS. 7A-7C, in some embodiments, for at least two neighboring first protrusions 100-1, 100-2, the optically diffusive layer 10' substantially conforms to the two neighboring first protrusions 100-1, 100-2 so as to form two concentric portions 13-1, 13-2 where the optically diffusive layer 10' is substantially concentric with the two neighboring first protrusions 100-1, 100-2, but does not form a parallel portion between the two concentric portions 13-1, 13-2.

In some embodiments, for at least one of the first protrusions, the concentric portion 13 of the optically diffusive layer 10' leaves a peak of the at least one of the first protrusions exposed.

In the illustrated embodiment of FIG. 7C, for the first protrusion 100-1, the concentric portion 13-1 of the optically diffusive layer 10' leaves a peak 76 for the first protrusion 100-1 exposed.

In some embodiments, the at least one of the first protrusions with the peak exposed (e.g., the first protrusion 100-1) includes at least 1% of the plurality of first protrusions 100. In some embodiments, the at least one of the first protrusions includes at least 2%, at least 3%, at least 4%, or at least 5% of the plurality of first protrusions 100.

Further, the optically diffusive layer 10' substantially conforms to the first protrusions 100 so as to form a plurality of connecting portions 16 connecting the plurality of concentric portions 13. In the illustrated embodiment of FIG. 7C, the optically diffusive layer 10' substantially conforms to the first protrusions 100-1, 100-2, 100-3 so as to form a connecting portion 16-1 connecting the concentric portions 13-1 and 13-2, and a connecting portion 16-2 connecting the concentric portions 13-1 and 13-3.

Further, a thickness variation of the optically diffusive layer 10' across at least 80% of a total surface area of the optically diffusive layer 10' occupied by the connecting portions 16 (e.g., 16-1, 16-2) is less than about 30%. In other words, the thickness of the optically diffusive layer 10' across at least 80% of the total surface area of the optically diffusive layer 10' occupied by the connecting portions 16 may not vary above 30%. In some embodiments, the thickness variation of the optically diffusive layer 10' across at least 80% of the total surface area of the optically diffusive layer 10' occupied by the connecting portions 16 is less than about 25%, less than about 20%, less than about 15%, or less than about 10%. Therefore, the thickness of the optically diffusive layer 10' across at least 80% of the total surface area of the optically diffusive layer 10' occupied by the connecting portions 16 may be substantially constant.

Figure 8A:
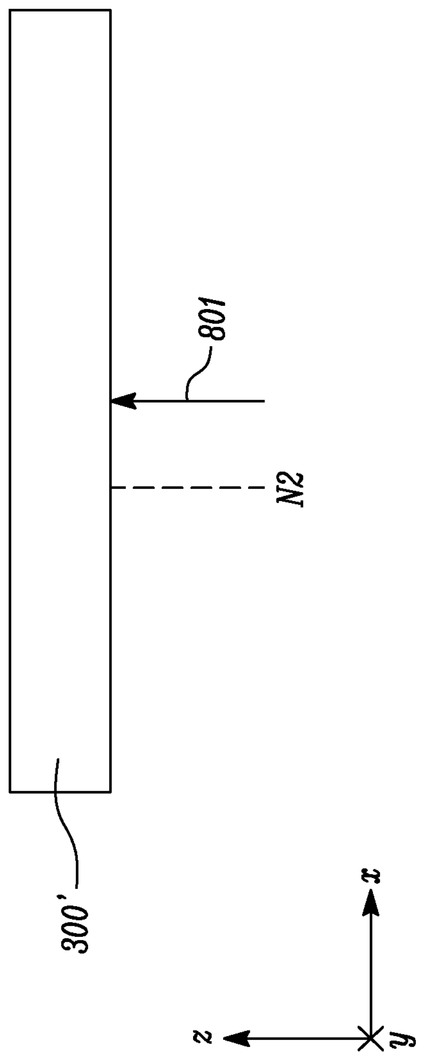
FIG. 8A illustrates a schematic sectional view of the optical film, according to an embodiment of the present disclosure.

FIG. 8A illustrates a schematic sectional view of the optical film 300' shown in FIGS. 7A-7C, according to an embodiment of the present disclosure. FIG. 8A further illustrates a substantially collimated substantially normally incident light 801 incident on the optical film 300'. i.e., the substantially collimated substantially normally incident light 801 is incident at an angle of about 0) degree with respect to a normal N2 to the optical film 300'. The substantially collimated substantially normally incident light 801 may be interchangeably referred to as "the incident light 801".

Figure 8B:
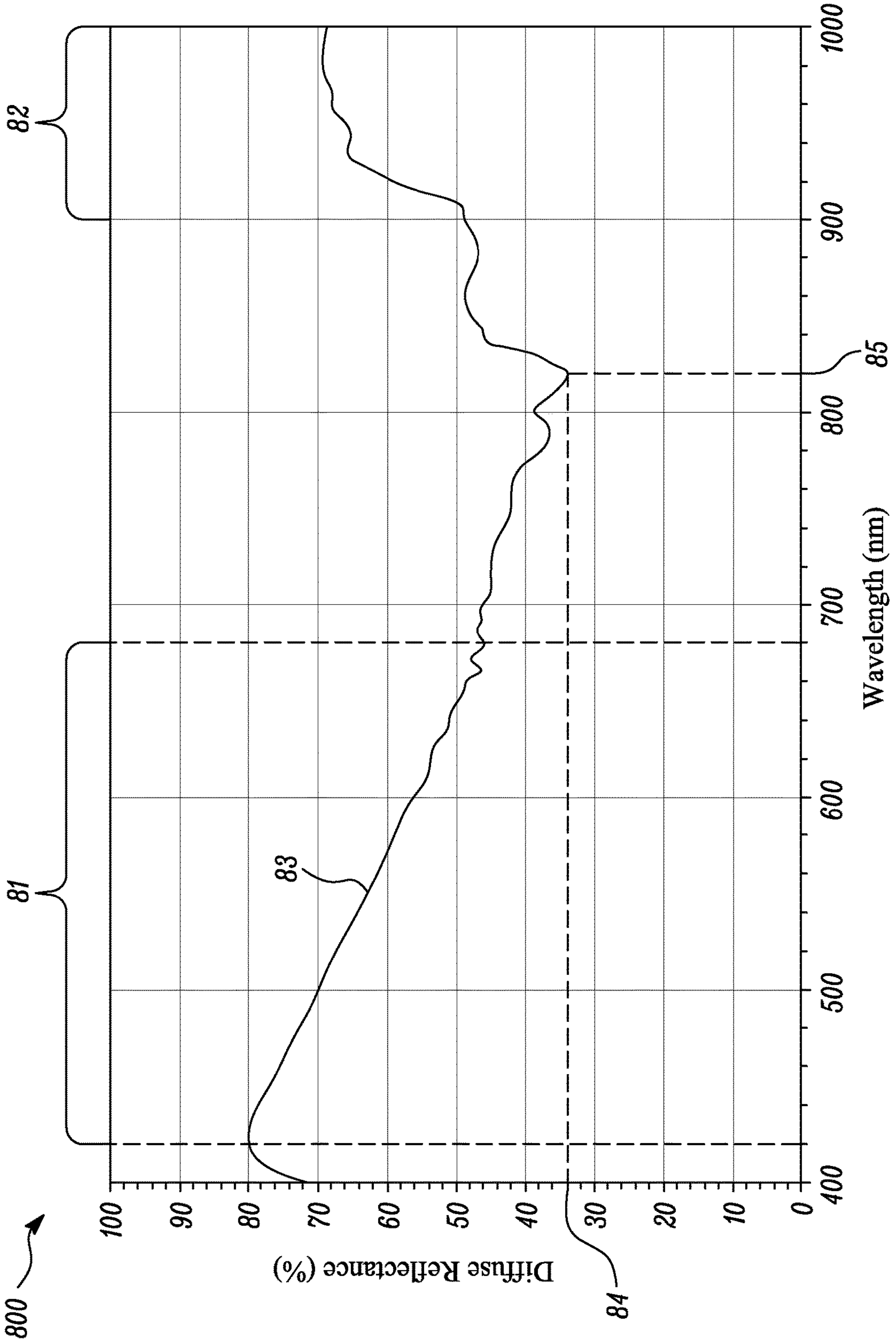
FIG. 8B illustrates a plot depicting optical characteristics of the optical film of FIG. 8A, according to an embodiment of the present disclosure.

FIG. 8B illustrates a plot 800 depicting optical characteristics of the optical film 300' shown in FIG. 8A, according to an embodiment of the present disclosure. Specifically, the plot 800 depicts a diffuse reflectance of the optical film versus wavelength 83. The diffuse reflectance of the optical film versus wavelength 83 may be interchangeably referred to as "the diffuse reflectance versus wavelength 83". The diffuse reflectance versus wavelength 83 illustrates a variation of diffuse reflectance of the optical film 300' with wavelength of the incident light 801 incident on the optical film 300'. Wavelength is expressed in nanometers (nm) on the abscissa, and diffuse reflectance is expressed as a reflectance percentage on the left ordinate axis.

Referring now to FIGS. 8A and 8B, as is apparent from the plot 800, for the substantially collimated substantially normally incident light 801 and the visible wavelength range 81 and the infrared wavelength range 82, the diffuse reflectance versus wavelength 83 has a global minimum 84 at a first wavelength 85 disposed between the visible and infrared wavelength ranges 81, 82. In some embodiments, the first wavelength 85 is between about 750 nm and about 880 nm. In some embodiments, the global minimum 84 is between about 30% and about 50%. In the plot 800, the first wavelength 85 is about 820 nm and the global minimum 84 is about 32%.

Referring now to FIGS. 1 to 8B, the optical diffusive layers 10, 10' of the respective optical films 300, 300' may provide the optical haze due to the presence of the plurality of nanoparticles 20, 30 and the plurality of voids 70 in the visible wavelength range 81 and may further provide a substantially high specular transmittance in the infrared wavelength range 82. In other words, the plurality of nanoparticles 20, 30 and the plurality of voids 70 may be substantially transparent to incident light in the infrared wavelength range 82. Further, the plurality of nanoparticles 20, 30 having the nanoparticle size distribution 40 including the at least two distinct first and second peaks 41, 42 at the respective nanoparticle sizes d1 and d2, such that 1.5≤(d2/d1)≤10, and the respective weight percentages W1 and W2 of the nanoparticles within the respective FWHMS of the first and second peaks 41, 42, such that 1.1≤(W1/W2)≤2, may provide an increased dry thickness of the optical diffusive layers 10, 10' without negatively affecting a cohesive strength of the optical diffusive layers 10, 10'. Therefore, the optical diffusive layers 10, 10' of the present disclosure may reduce the negative effect of aging. i.e., non-uniform optical haze upon continued exposure to high temperatures and/or high humidity, without compromising the cohesive strength of the optical diffusive layers 10, 10'. Specifically, the decrease in the optical haze of the optical films 300, 300' by subjecting the optical films 300, 300' to a relative humidity of about 95% and a temperature of about 65° C. for at least 200 hours is less than about 10%. Further, the optical haze provided by the optical diffusive layers 10, 10' may be controlled by varying the respective weight percentages W1 and W2 and/or the respective nanoparticle sizes d2 and d1 of the plurality of nanoparticles 20, 30.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An optical film comprising an optically diffusive single layer having an average thickness of between about 0.5 and about 5 microns and comprising:

opposing first and second major surfaces;

a plurality of nanoparticles dispersed between and across the first and second major surfaces, the nanoparticles comprising silica, the plurality of nanoparticles having a nanoparticle size distribution comprising at least two distinct first and second peaks at respective nanoparticle sizes d1 and d2, $1.5 \le d2/d1 \le 10$, wherein the nanoparticles in the plurality of nanoparticles within a full width at half maximum (FWHM) of the first peak and within a FWHM of the second peak form respective W1 and W2 percent by weight of the plurality of nanoparticles, $1.1 \le W1/W2 \le 2$; and a polymeric material bonding the nanoparticles to each other to form a plurality of nanoparticle aggregates defining a plurality of voids therebetween, wherein, for a substantially collimated substantially normally incident light and a visible wavelength range from about 420 nanometers (nm) to about 680 nm and an infrared wavelength range from about 900 nm to about 1000 nm, the optical film has:

in the visible wavelength range, an average specular transmittance VTs and an average total transmittance VTt; and in the infrared wavelength range, an average total transmittance ITt and an average specular transmittance ITs, $0.3 \le VTs/VTt \le 0.7$, $VTs/ITs \le 0.25$, $ITs/ITt \ge 0.7$.

2. The optical film of claim 1, wherein 50 nm≤d2≤100 nm and 5 nm≤d1≤50 nm.

3. The optical film of claim 1 further comprising a substrate disposed on the optically diffusive single layer and comprising: (a) a reflective polarizer, and wherein for the substantially collimated substantially normally incident light and the visible wavelength range, the reflective polarizer has an average optical transmittance of at least 40% for a first polarization state and an average optical reflectance of at least 40% for an orthogonal second polarization state; (b) an absorbing polarizer, and wherein for the substantially collimated substantially normally incident light and the visible wavelength range, the absorbing polarizer has an average optical transmittance of at least 40% for a first polarization state and an average optical absorption of at least 60% for an orthogonal second polarization state; or (c) an optical mirror, such that for the substantially collimated substantially normally incident light and the visible wavelength range, the optical mirror has an average optical reflectance of at least 60% for each of mutually orthogonal first and second polarization states.

4. The optical film of claim 1, wherein in a plane of a cross-section of the optically diffusive single layer in the thickness direction of the optically diffusive single layer, the nanoparticles are substantially circular.

* * * * *